US009732672B2

(12) United States Patent
Ewens et al.

(10) Patent No.: US 9,732,672 B2
(45) Date of Patent: Aug. 15, 2017

(54) METHOD AND SYSTEM FOR GAS TURBINE POWER AUGMENTATION USING STEAM INJECTION

(71) Applicant: General Electric Company, Schenectady, NY (US)

(72) Inventors: David Spencer Ewens, Greer, SC (US); Michael Corey Mullen, Knoxville, TN (US); Bhushan Meshram, Maharashtra (IN)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 14/064,815

(22) Filed: Oct. 28, 2013

(65) Prior Publication Data

US 2015/0113997 A1    Apr. 30, 2015

(51) Int. Cl.
*F02C 3/30* (2006.01)
*F02C 7/143* (2006.01)
*G05D 7/06* (2006.01)

(52) U.S. Cl.
CPC ............ *F02C 3/305* (2013.01); *F02C 7/1435* (2013.01); *G05D 7/0617* (2013.01); *F05D 2260/2322* (2013.01)

(58) Field of Classification Search
CPC .......... F02C 3/30; F02C 3/305; F02C 7/1435; F05D 2260/2322; F05D 2270/16; F05D 2270/3032; F23D 11/01; F23L 2900/07008; F23L 2900/07009

See application file for complete search history.

(56) References Cited

U.S. PATENT DOCUMENTS

| 5,357,741 | A | 10/1994 | Talabisco et al. |
| 6,357,218 | B1 | 3/2002 | Ranasinghe et al. |
| 6,405,521 | B1 | 6/2002 | Ranasinghe et al. |
| 6,499,303 | B1 | 12/2002 | Polukort et al. |
| 2002/0106001 | A1* | 8/2002 | Tomlinson ............ F02C 7/1435 374/144 |
| 2010/0162724 | A1* | 7/2010 | Myers ....................... F23N 5/00 60/794 |

(Continued)

FOREIGN PATENT DOCUMENTS

| EP | 2522829 A2 | 11/2012 |
| EP | 2733318 A1 | 5/2014 |

(Continued)

OTHER PUBLICATIONS

European Search Report and Written Opinion issued in connection with corresponding EP Application No. 14189952.6-1607 dated Mar. 23, 2015.

*Primary Examiner* — Pascal M Bui Pho
*Assistant Examiner* — Marc Amar
(74) *Attorney, Agent, or Firm* — Armstrong Teasdale LLP

(57) ABSTRACT

A method of augmenting power output by a gas turbine engine includes channeling fuel into the gas turbine engine at a predetermined fuel flow rate to generate a first power output. Steam is then injected into the gas turbine engine at a first steam flow rate, and a firing temperature bias is determined based at least on the first steam flow rate. The predetermined fuel flow rate is then adjusted based on the determined firing temperature bias such that the gas turbine engine generates a second power output greater than the first power output.

20 Claims, 4 Drawing Sheets

(56) References Cited

U.S. PATENT DOCUMENTS

2014/0024726 A1* 1/2014 Meyer-Pittroff .... C07C 29/1518
518/704
2014/0325990 A1* 11/2014 Takeda ...................... F02C 9/20
60/775

FOREIGN PATENT DOCUMENTS

JP        09 125984     5/1997
JP        2005-036766   2/2005

* cited by examiner

METHOD AND SYSTEM FOR GAS TURBINE POWER AUGMENTATION USING STEAM INJECTION

BACKGROUND

The embodiments described herein relate generally to power augmentation of a gas turbine engine, and more specifically, to a method and system for augmenting the power of a gas turbine engine using steam injection.

A gas turbine is comprised of a compressor section that produces compressed air that is subsequently heated by burning fuel in a combustion section. The hot gas from the combustion section is directed to a turbine section where the hot gas is used to drive a rotor shaft, thereby producing shaft power. The shaft power is used to drive the compressor. Excess power not consumed by the compressor drives a generator that produces electrical power. The amount of power imparted to the shaft is a function of the mass flow and temperature of the hot gas flowing through the turbine, specifically the temperature at the inlet of the turbine.

When operating at base load, the firing temperature of the combustion gases at the inlet of the turbine is limited to an operational maximum to prevent degradation of turbine components. Specifically, if additional fuel were introduced to the system to increase the mass flow and turbine inlet firing temperature, and therefore the power output, the resulting increase in the firing temperature at the turbine inlet would potentially damage the engine. It is known that steam may be injected into a gas turbine engine to increase the mass flow through the turbine for power augmentation independent of an increase in firing temperature.

Traditional control systems controlled the firing temperature of the turbine by scheduling the exhaust temperature of the turbine to be a function of the compressor pressure ratio such that when the compressor pressure ratio increased due to the introduction of steam, the exhaust temperature, and therefore the firing temperature, of the turbine decreased to prevent degradation of the turbine components. However, modern control systems include models that estimate the firing temperature of the engine directly and enable the control system to schedule the firing temperature independent of the compressor pressure ratio and/or steam injection. In these modern control systems, the natural suppression that took place when firing temperature was a function of the compressor pressure ratio no longer occurs.

Therefore, it is desirable to provide a gas turbine into which large amounts of steam can be safely introduced in order to augment the power output of the turbine, and in which the firing temperature at the turbine inlet is suppressed to prevent degradation of turbine components.

BRIEF DESCRIPTION

In one aspect, a method of augmenting power output by a gas turbine engine is provided. The method includes channeling fuel into the gas turbine engine at a predetermined fuel flow rate to generate a first power output. Steam is then injected into the gas turbine engine at a first steam flow rate, and a firing temperature bias is determined based at least on the first steam flow rate. The predetermined fuel flow rate is then adjusted based on the determined firing temperature bias such that the gas turbine engine generates a second power output greater than the first power output.

In another aspect, a computer-readable storage medium having computer-executable instructions embodied thereon is provided. When executed by a computing device having at least one processor, the computer-executable instructions cause the computing device to operate a fuel delivery system to channel fuel into a gas turbine engine at a predetermined fuel flow rate to generate a first power output and to operate a steam injection system to inject steam into the gas turbine engine at a first steam flow rate. The computing device then determines a firing temperature bias based at least on the first steam flow rate, and adjusts the predetermined fuel flow rate based on the determined firing temperature bias such that the gas turbine engine generates a second power output greater than the first power output.

In yet another aspect, a control system for augmenting power output by a gas turbine engine is provided. The control system includes a plurality of sensors configured to measure various gas turbine engine operating parameters and a controller in communication with the plurality of sensors. The controller includes a memory storage device and a processor in communication with the memory storage device. The processor is configured to receive the measured gas turbine engine operating parameters from the plurality of sensors and to operate a fuel delivery system to channel fuel into the gas turbine engine at a predetermined fuel flow rate to generate a first power output. The processor is also configured to operate a steam injection system to inject steam into the gas turbine engine at a first steam flow rate and to determine a firing temperature bias based on the first steam flow rate and at least one of the measured gas turbine operating parameters. The processor then adjusts the predetermined fuel flow rate based on the determined firing temperature bias such that the gas turbine engine generates a second power output greater than the first power output.

DETAILED DESCRIPTION

Figure 1:
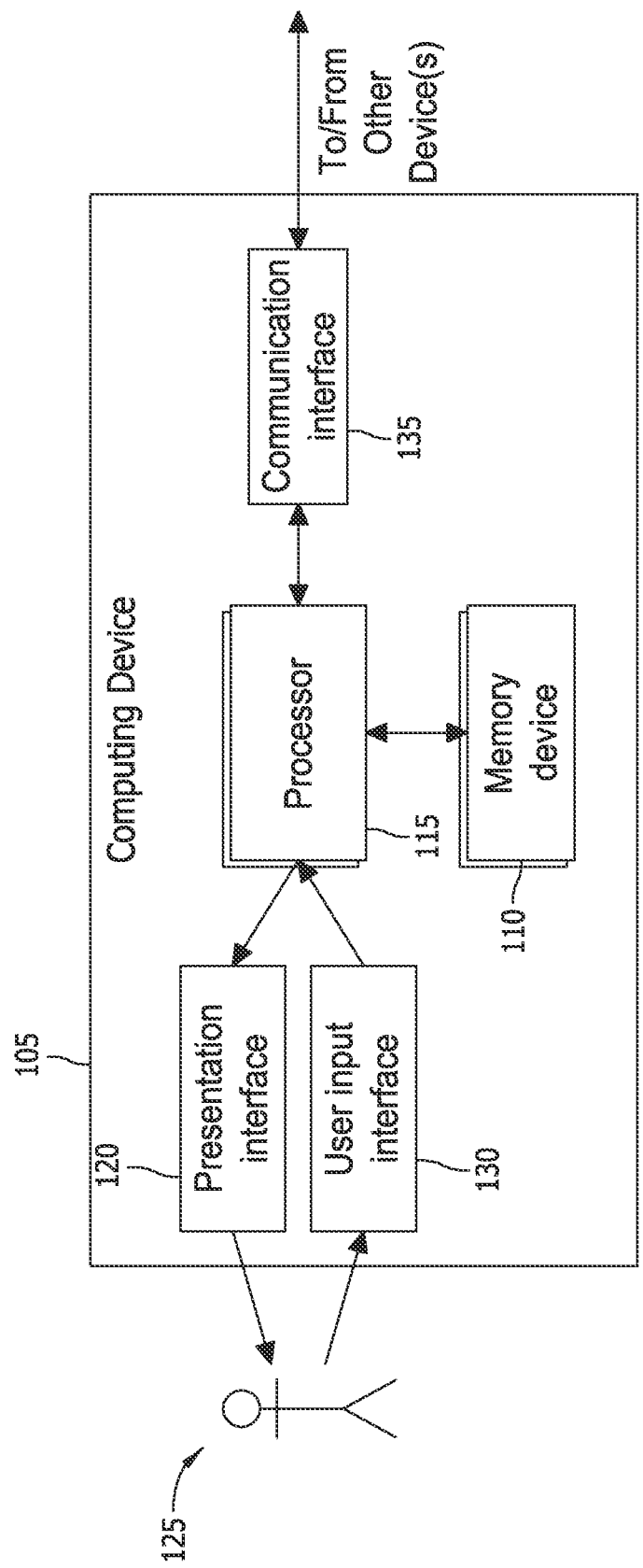
FIG. 1 is a schematic diagram of an exemplary computing device.

FIG. 1 is a block diagram of an exemplary computing device 105 that may be used to control fuel and steam supply to an engine (not shown in FIG. 1) and/or, including, without limitation, a fuel delivery system and a steam injection system (neither shown in FIG. 1). Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, and/or read-only memory (ROM). The above memory types are exemplary only, and are thus not limiting as to the types of memory usable for storage of a computer program.

Moreover, as used herein, the term "non-transitory computer-readable media" includes all tangible, computer-readable media, such as a floppy disk, CD-ROMs, DVDs and other digital sources such as a network or the Internet, as well as yet to be developed digital means, with the sole exception being a transitory, propagating signal.

Memory device 110 may be configured to store operational measurements including, without limitation, real-time and historical temperature and mass flow values, and/or any other type data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate fuel and steam supply to a turbine engine (discussed further below).

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices.

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
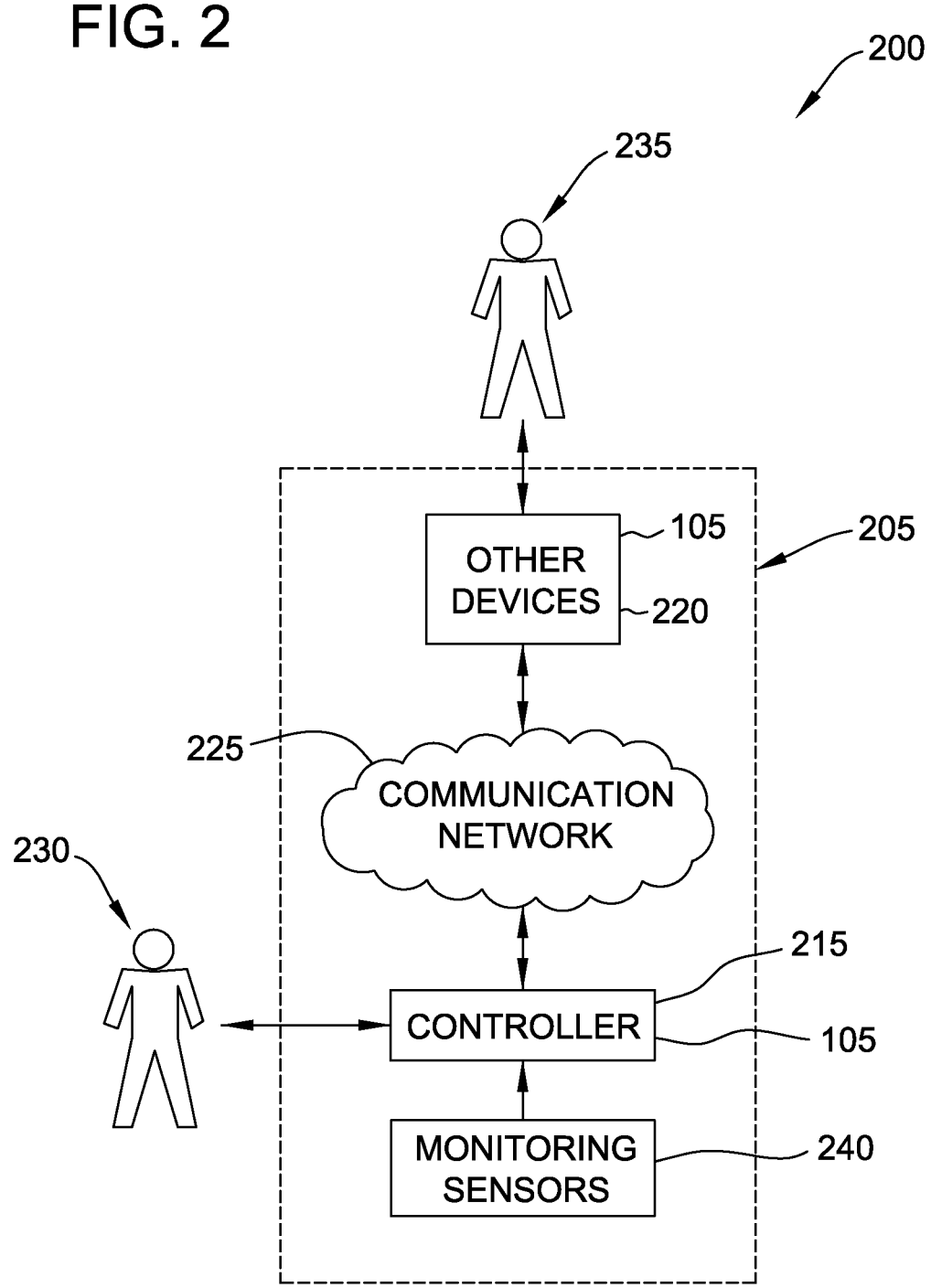
FIG. 2 is schematic diagram of a portion of an exemplary power augmentation system.

FIG. 2 is block diagram of a portion of an exemplary power augmentation system 200 that may be used to augment the power output of a gas turbine engine 205. Power augmentation system 200 includes at least one controller 215 that may be coupled to other devices 220 via a communication network 225. Controller 215 may be, without limitation, a facility-level centralized controller, a switchgear-level centralized controller, one of a plurality of distributed controllers, and a portable controller. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, controller 215 may perform all of the operations below.

Referring to FIGS. 1 and 2, controller 215 is a computing device 105. In the exemplary embodiment, computing device 105 is coupled to network 225 via communication interface 135. In an alternative embodiment, controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein.

Controller 215 interacts with a first operator 230 (e.g., via user input interface 130 and/or presentation interface 120). In one embodiment, controller 215 presents information about gas turbine engine 205, such as alarms and/or measured data, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining gas turbine engine 205, including, without limitation, shift operations personnel, maintenance technicians, and facility supervisors.

In the exemplary embodiment, gas turbine engine 205 includes a plurality of monitoring sensors 240. Monitoring sensors 240 collect operational measurements including, without limitation, the mass flow of air and air temperature at various locations within gas turbine engine 205. Monitoring sensors 240 repeatedly (e.g., periodically, continuously, and/or upon request) transmit operational measurement readings at the time of measurement. Controller 215 receives and processes the operational measurement readings. Also, controller 215 includes, without limitation, sufficient data, algorithms, and commands to facilitate condition monitoring of gas turbine engine 205 (discussed further below).

Also, in alternative embodiments, additional monitoring sensors (not shown) similar to monitoring sensors 240 may collect operational data measurements associated with other systems of gas turbine engine 205 including, without limitation, fuel flow rates and the rotational speed of engine 205 components. Such data is transmitted across network 225 and may be accessed by any device capable of accessing network 225 including, without limitation, desktop computers, laptop computers, and personal digital assistants (PDAs) (neither shown).

In the exemplary embodiment, monitoring sensors 240 may generate a large volume of data. Therefore, other devices 220 includes at least one data server with a database and storage system that enables operation of gas turbine engine 205 and power augmentation system 200 as described herein.

Figure 3:
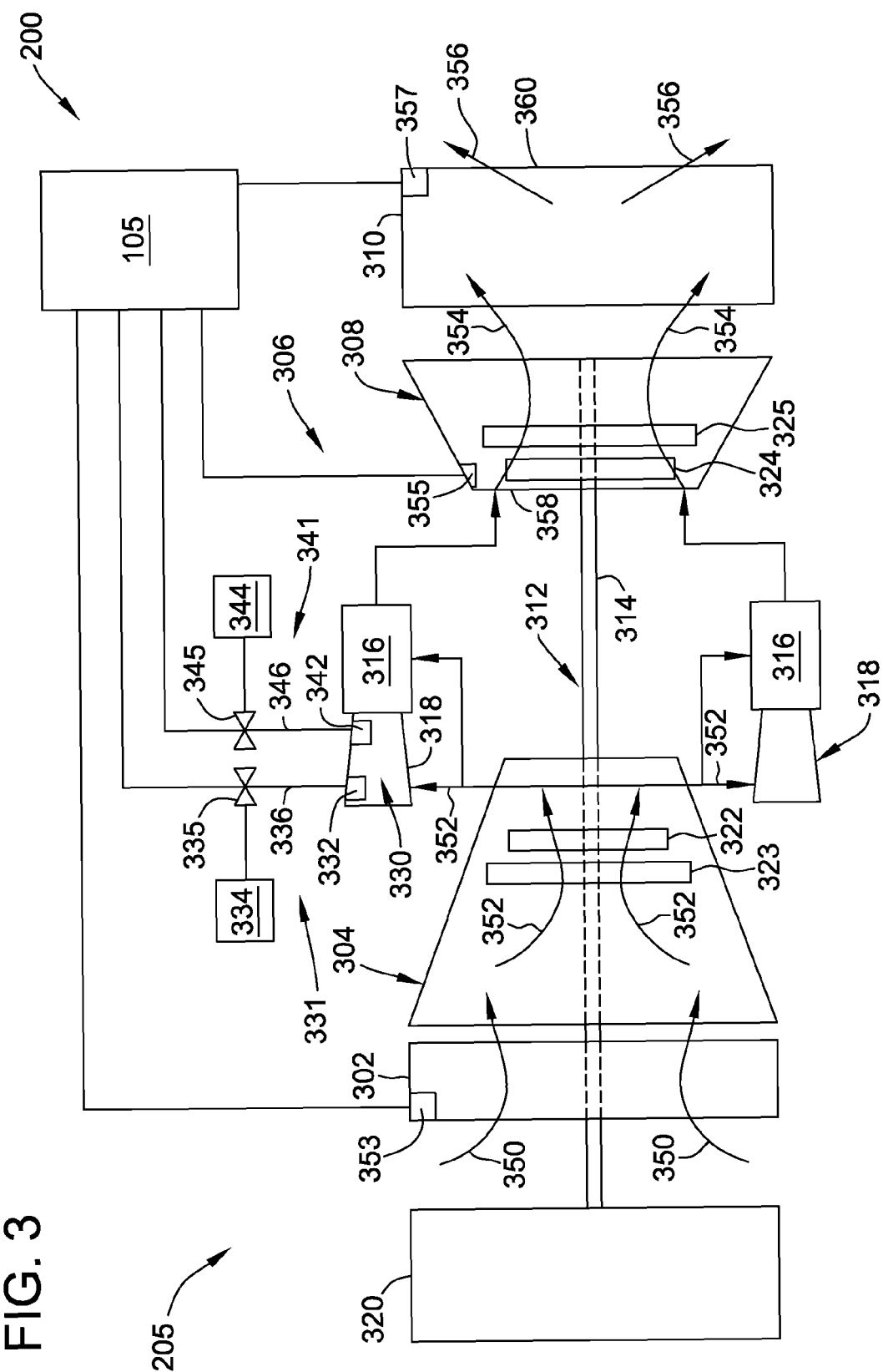
FIG. 3 is schematic diagram of an exemplary turbine engine.

FIG. 3 is a schematic view of gas turbine engine 205. In the exemplary embodiment, gas turbine engine 205 includes an air intake section 302, and a compressor section 304 that is coupled downstream from, and in flow communication with, intake section 302. A combustor section 306 is coupled downstream from, and in flow communication with, compressor section 304, and a turbine section 308 is coupled downstream from, and in flow communication with, combustor section 306. Turbine engine 205 includes an exhaust section 310 that is downstream from turbine section 308. Moreover, in the exemplary embodiment, turbine section 308 is coupled to compressor section 304 via a rotor assembly 312 that includes a drive shaft 314.

In the exemplary embodiment, combustor section 306 includes a plurality of combustor assemblies, i.e., combustors 316 that are each coupled in flow communication with compressor section 304. Combustor section 306 also includes at least one fuel nozzle assembly 318. Each combustor 316 is in flow communication with at least one fuel nozzle assembly 318. Moreover, in the exemplary embodiment, turbine section 308 and compressor section 304 are rotatably coupled to a load 320 via drive shaft 314. For example, load 320 may include, without limitation, an electrical generator and/or a mechanical drive application, e.g., a pump. In the exemplary embodiment, compressor section 304 includes at least one compressor blade assembly 322, i.e., blade 322 and at least one adjacent stationary vane assembly, i.e., vane 323.

Also, in the exemplary embodiment, turbine section 308 includes at least one turbine blade assembly, i.e., bucket 324 and at least one adjacent stationary vane assembly, i.e., vane 325. Each compressor blade assembly 322 and each turbine bucket 324 are coupled to rotor assembly 312, or, more specifically, to drive shaft 314. Engine 205 further includes the plurality of monitoring sensors 240 (shown in FIG. 2). Monitoring sensors 240 include at least a compressor inlet temperature ($T_{ci}$) sensor 353, an initial steam flow rate ($Flow_{meas}$) sensor 355, and a turbine exhaust temperature ($T_{ex}$) sensor 357.

Further, in the exemplary embodiment, each fuel nozzle assembly 318 includes a plurality of nozzles 330. More specifically, each fuel nozzle assembly 318 is in flow communication with at least one fuel system 331. Fuel system 331 includes a fuel nozzle 332 coupled in flow communication with a fuel source 334 via a fuel supply manifold 336. Fuel system 331 also includes a fuel metering valve 335 coupled to manifold 336 between fuel source 334 and fuel nozzle 332. Such fuels are carbonaceous gaseous or liquid fuels that enable operation of turbine engine 205 as described herein including, without limitation, clean syngas, natural gas, or liquid diesel. Also, each fuel nozzle assembly 318 is in flow communication with a steam injection system 341. Steam injection system 341 includes a steam injection nozzle 342 coupled in flow communication with a steam source 344 via a steam supply manifold 346. Steam injection system 341 also includes a steam metering valve 345 coupled to manifold 346 between steam source 344 and steam injection nozzle 342. Valves 335 and 345 are coupled to controller 105.

In operation, air intake section 302 channels inlet air 350 towards compressor section 304. Compressor section 304 compresses inlet air 350 to higher pressures and temperatures prior to discharging compressed air 352 towards combustor section 306. Compressed air 352 is channeled to fuel nozzle assembly 318, mixed with fuel, and burned within each combustor 316 to generate combustion gases 354 that are channeled downstream towards turbine section 308. Fuel from source 334 is also channeled through manifold 336 to fuel nozzle assembly 318, wherein the fuel is mixed with compressed air 352 and ignited within combustors 316. Combustion gases 354 generated within combustors 316 are channeled downstream towards turbine section 308. After impinging turbine bucket 324, thermal energy is converted to mechanical rotational energy that is used to drive rotor assembly 312. Turbine section 308 drives compressor section 304 and/or load 320 via drive shaft 314, and exhaust gases 356 are discharged through an outlet 360 of exhaust section 310 to ambient atmosphere. Alternatively, exhaust gases 356 may be discharged to a heat recovery unit (not shown) for use within the steam injection system 341.

In operation, under certain conditions, fuel is channeled to fuel nozzle 332, within fuel nozzle assembly 318, from fuel source 334 and through fuel metering valve 335 via fuel supply manifold 336. The fuel is ignited, and subsequently, turbine engine 205 operates on fuel alone. When engine 205 is operating at base load and steam injection system 341 is non-operational, controller 105 and fuel metering valve 335 are configured to channel fuel through manifold 336 to nozzle assembly 318 until the temperature of combustion gases 354 at an inlet 358 to turbine 308 reaches a predetermined target limit, the firing temperature ($T_{fire}$). In the exemplary embodiment, controller 105 includes logic that estimates the firing temperature, and is configured to limit fuel flow to engine 205 when the estimated firing temperature reaches the predetermined firing temperature limit. This target limit prevents controller 105 from adding more fuel that may cause the firing temperature to exceed a maximum operating temperature of turbine bucket 324 and vane 325. As such, the amount of power generated by engine 205 at base load is a function of at least the firing temperature and limited by the operational limitations of turbine 308 components.

When additional power is required from engine 205 already operating at base load, operator 230 (shown in FIG. 2) inputs a desired steam flow into controller 105 that incorporates steam injection system 341 into already-operational fuel injection system 331. In the exemplary embodiment, controller 105 is configured to control valves 335 and 345 to channel fuel and steam into nozzle assembly 318. Steam flow may be scheduled as a percent of the total mass flow of air flowing through compressor 304. The steam and fuel mixture is then ignited in combustors 316 to form combustion gases 354 that facilitate increasing the compressor pressure ratio and the mass flow of combustion gas 354 through turbine 308 to generate more power than is produced when engine 205 is operating on fuel alone. The firing temperature of the combustion gases 354 increases because of the injected steam and fuel, and at least some of the heat is transferred to the internal components of turbine 308, such as bucket 324 and vane 325. As such, the firing temperature at turbine inlet 358 after steam injection may exceed the predetermined limit, and, therefore, the maximum operating temperature of bucket 324 and vane 325 such that the operational lifespan of bucket 324 and vane 325 is shortened. In the exemplary embodiment, power augmentation system 200 is configured to simultaneously increase the power output of engine 205 through steam injection while suppressing the firing temperature at turbine inlet 358 to preserve the life of turbine 308 components as described in further detail below.

Figure 4:
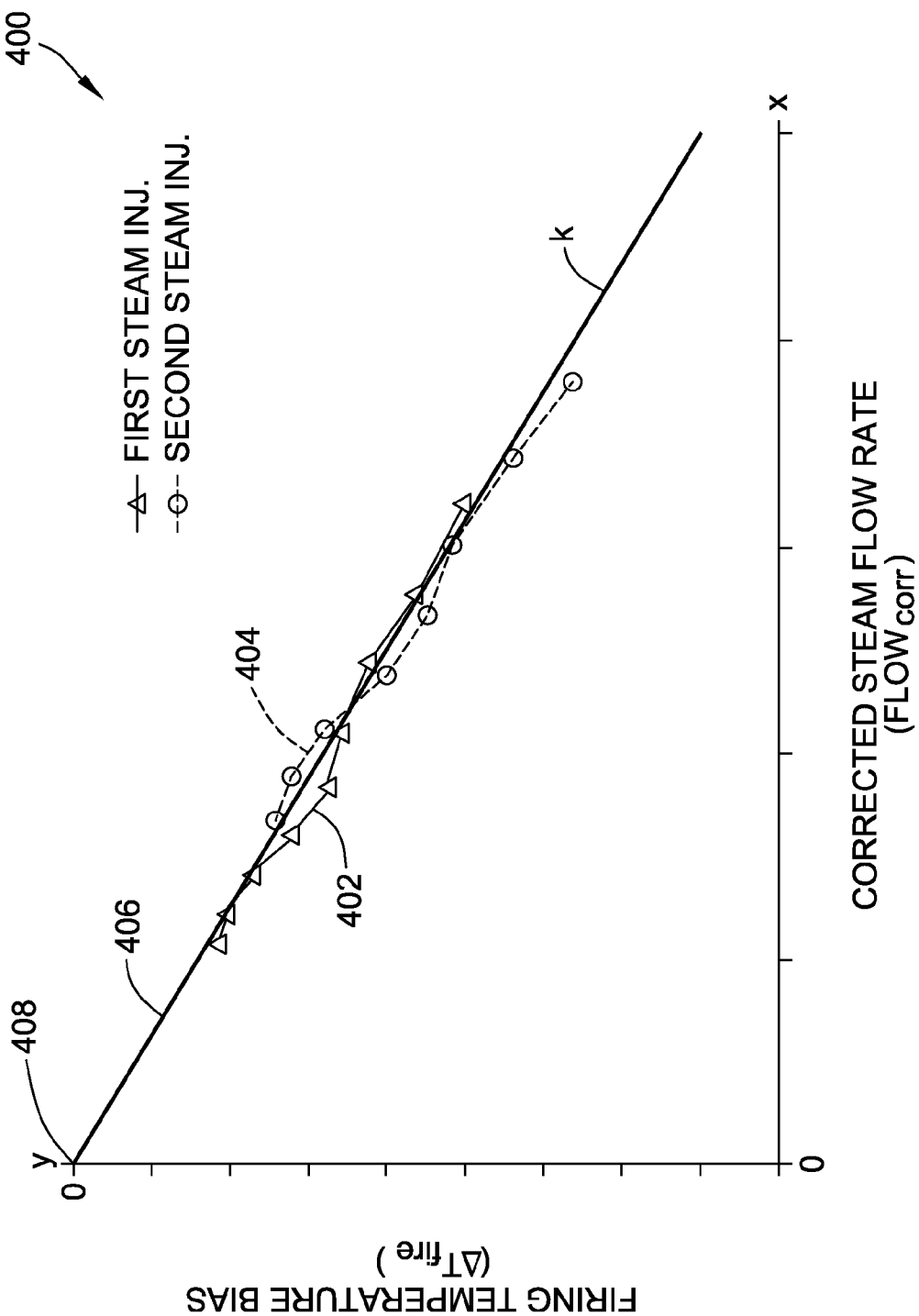
FIG. 4 is a graph illustrating the relationship between corrected steam flow ($Flow_{corr}$) versus the bias applied to the firing temperature ($T_{fire}$) of combustion gases.

FIG. 4 illustrates a graphical representation 400 of the relationship between a corrected steam flow rate (Flow$_{corr}$) through engine 205 (shown in FIG. 3) versus a required firing temperature suppression, or bias ($\Delta T_{fire}$), to preserve the part life of turbine 308 components. The X-axis of graph 400 is corrected steam flow rate (Flow$_{corr}$) through turbine 308 (shown in FIG. 3), and the Y-axis is the suppression, or bias ($\Delta T_{fire}$), required to decrease the firing temperature to a temperature at which turbine 308 components, such as buckets 324 and vanes 325 (both shown in FIG. 3), are able to safely operate. Because the bias acts to reduce the firing temperature, values along the Y-axis are negative such that an origin 408 of graph 400 represents engine 205 operating at base load with no steam flow, and therefore no firing temperature bias. Data points plotted along graph 400 represent the calculated corrected steam flow versus the firing temperature bias for various ambient conditions at base load of engine 205. As ambient conditions change, specifically the temperature of air 350 at compressor inlet 302, as measured by temperature sensor 353 (all shown in FIG. 3), the mass flow through engine 205 changes, and the fixed ratio of air to injected steam results in controller 105 (shown in FIGS. 1-3) channeling varying amounts of steam through power augmentation system 200 (shown in FIGS. 2 and 3) at various compressor inlet 302 temperatures.

A line 402 represents a first standard steam flow rate as a percentage of the mass flow rate of air through turbine 308, and a line 404 represents a second standard steam flow rate as a percentage of the mass flow of air. Different steam flow rates are shown to demonstrate that power augmentation system 200 is operable for any standard desired steam flow rate as entered into controller 105 by at least one of operator 230 and 235 (both shown in FIG. 2). A line 406 represents a best fit line for the plotted analytical data, where line 406 begins at origin 408, representing engine 205 operating at base load with no steam flow, and therefore no firing temperature bias. Line 406, having slope k, represents the best fit line for various standard desired steam flow rates at varying compressor inlet 302 temperatures. As such, line 406 and its slope k are stored on controller as pre-determined data for use in determining the firing temperature bias as described below.

An initial steam flow rate (Flow$_{meas}$) is measured by sensor 355 (shown in FIG. 3), but requires correction to the corrected steam flow rate (Flow$_{corr}$) that may be used to calculate the firing temperature bias to prevent failure of turbine 308 components. The corrected steam flow rate is a function of the compressor inlet 302 temperature, specifically $$\text{Flow}_{corr} = \text{Flow}_{meas}(1/\theta)^Z \qquad \text{Equation (1)}$$

where Flow$_{meas}$ is the steam flow rate as measured by sensor 355, Z is determined empirically, and $\theta$ is ($T_{ci}/T_{ref}$) where $T_{ref}$ is a known reference temperature and $T_{ci}$ is the compressor inlet 302 temperature as measured by sensor 353. Controller 105 is configured to calculate the corrected steam flow rate based on the measured steam flow rate, measured compressor inlet temperature, and pre-determined Z value.

Once the corrected flow rate is calculated, operator 230 or 235 may then determine firing temperature suppression bias, $\Delta T_{fire}$, by identifying at what point along reference line 406 the corrected flow rate falls, and determining the corresponding firing temperature bias along the Y-axis of graph 400. Alternatively, because reference line 406 has a constant slope k, controller 105 may be configured to calculate the firing temperature bias by $$(\text{Flow}_{corr})(k) = \Delta T_{fire}. \qquad \text{Equation (2)}$$

Once the firing temperature bias is determined, controller 105 is configured to regulate the flow of fuel via valve 335 (shown in FIG. 3) such that the operating temperature at turbine inlet 358 (shown in FIG. 3), the firing temperature, is controlled based on the firing temperature bias. Specifically, controller 105 controls the firing temperature from the predetermined firing temperature limit described above when engine 205 is operating a base load and steam injection system 341 (shown in FIG. 3) is non-operational to a suppressed firing temperature limit that prevents degradation of turbine 308 components when steam system 341 is operational. In the exemplary embodiment, the difference between the predetermined firing temperature limit and the suppressed firing temperature limit is the firing temperature bias. Thus, the bias facilitates the augmentation of power to achieve maximum power output because of the additional mass flow through turbine 308 due to steam injection, while regulating the firing temperature to prevent degradation of turbine 308 components such as buckets 324 and vanes 325.

For example, when engine 205 is operating at base load and steam injection system 341 is non-operational, controller 105 is configured to deliver fuel through fuel system 331 at a first rate such that a predetermined $T_{fire}$ limit is reached. In the exemplary embodiment, operator 230 or 235 will then input a request to power augmentation system 200 to introduce a steam flow to engine 205 to increase the amount of power generated. The amount of steam injected into engine 205 is a percent of total mass flow of air through turbine 308. Sensor 355 then measures the total air flow and controller 105 calculates the rate at which steam is to be injected corresponding to the operator's 230 request.

As described above, the additional steam and fuel required to combust the steam would raise the firing temperature above the predetermined limit that prevents degradation of turbine 308 components. Therefore, the steam flow rate and amount of fuel added to ignite the steam require a correction to suppress the firing temperature of combustion gases 354. Power augmentation system 200 then calculates a corrected steam flow rate using Equation (1). To calculate the corrected steam flow rate, controller 105 uses the measured steam flow rate from sensor 355 and the measured compressor inlet temperature from sensor 353 in addition to other data measured by monitoring sensors 240.

In the exemplary embodiment, power augmentation system 200 then calculates the firing temperature bias required to maintain maximum power output, but also to prevent damage to turbine 308 components. As described above, in the exemplary embodiment, controller 105 of power augmentation system 200 contains logic to determine the slope k of best fit line 406, from which the firing temperature bias may be calculated using Equation (2) and the corrected steam flow rate previously calculated by controller 105. Alternatively, one of operator 230 and 235 may determine the firing temperature bias from graph 400 by finding at what the firing temperature bias the corrected steam flow rate and reference line 406 intersect. Thus, the suppressed firing temperature is lower than the initial predetermined firing temperature limit.

In the exemplary embodiment, controller 105 is configured to regulate the flow of fuel via valve 335, upon the determination of the firing temperature bias, such that the firing temperature is controlled from the predetermined target limit temperature defined by controller 105 when engine 205 is operating at base load without steam injection system 341 to a suppressed firing temperature limit that prevents degradation of turbine 308 components when steam system 341 is operational. In the exemplary embodiment, the firing temperature bias is the difference between the predetermined firing temperature limit and the suppressed firing temperature limit. The firing temperature bias allows power augmentation system 200 to introduce a steam flow through steam injection system 341 such that engine 205 generates more power while maintaining a firing temperature after the introduction of steam to engine 205 that is approximately equal to the predetermined firing temperature limit when engine 205 is operating on fuel alone. Thus, the bias allows the augmentation of power to achieve maximum power output because of the additional mass flow through turbine 308 due to steam injection, while regulating firing temperature to prevent degradation of turbine 308 components such as buckets 324 and vanes 325.

A technical effect of the methods, systems, and apparatus described herein includes at least one of: (a) determining a corrected flow rate of steam based on a measured steam flow rate, a measured compressor inlet temperature, a measured exhaust gas temperature, and a calculated compressor pressure ratio; (b) determining a firing temperature bias, based on the determined corrected steam flow rate, required to maintain maximum power output from a gas turbine engine while preventing damage to engine components; and (c) regulating the flow of fuel based on the determined firing temperature bias such that the firing temperature is controlled from a predetermined target limit temperature defined by controller 105 when the gas turbine engine is operating at base load without steam injection to a suppressed firing temperature limit that prevents degradation of gas turbine components when steam is being injected.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the best mode and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of augmenting power output by a gas turbine engine using a computing device including at least one processor, said method comprising:
    channeling fuel into the gas turbine engine at a first fuel flow rate corresponding to a predetermined firing temperature limit to generate a first power output, wherein firing temperature is a temperature of combustion gases located at an inlet to a turbine of the gas turbine engine;
    determining a first steam flow rate;
    injecting steam into the gas turbine engine at the first steam flow rate;
    calculating a firing temperature bias based on the first steam flow rate;
    calculating a suppressed firing temperature limit based on the predetermined firing temperature limit and the firing temperature bias; and
    channeling fuel into the gas turbine engine at a second fuel flow rate corresponding to the suppressed firing temperature limit to generate a second power output greater than the first power output.

2. The method in accordance with claim 1 further comprising calculating a corrected steam flow rate based at least on the first steam flow rate.

3. The method in accordance with claim 2, wherein calculating a firing temperature bias further comprises calculating the firing temperature bias based on the calculated corrected steam flow rate.

4. The method in accordance with claim 2 further comprising measuring a temperature of air at a compressor inlet, wherein the corrected steam flow rate is based on the measured compressor inlet air temperature and the first steam flow rate.

5. The method in accordance with claim 1 further comprising measuring a mass flow rate of air within the gas turbine engine, wherein the first steam flow rate is based on the measured mass flow rate.

6. The method in accordance with claim 1, wherein channeling fuel into the gas turbine engine at a second fuel flow rate corresponding to the suppressed firing temperature limit reduces a firing temperature of the gas turbine engine from a first temperature at the first power output to a second temperature at the second power output.

7. A non-transitory computer-readable storage medium having computer-executable instructions embodied thereon, wherein when executed by a computing device having at least one processor, the computer-executable instructions cause the computing device to:

operate a fuel delivery system to channel fuel into a gas turbine engine at a first fuel flow rate corresponding to a predetermined firing temperature limit to generate a first power output, wherein firing temperature is a temperature of combustion gases located at an inlet to a turbine of the gas turbine engine;

receive a first steam flow rate;

operate a steam injection system to inject steam into the gas turbine engine at the first steam flow rate;

calculate a firing temperature bias based on the first steam flow rate;

calculate a suppressed firing temperature limit based on the predetermined firing temperature limit and the firing temperature bias; and operate the fuel delivery system to channel fuel into the gas turbine engine at a second fuel flow rate corresponding to the suppressed firing temperature limit to generate a second power output greater than the first power output.

8. The non-transitory computer-readable storage medium in accordance with claim 7, wherein when executed by the at least one processor, the computer-executable instructions further cause the at least one processor to calculate a corrected steam flow rate based on at least the first steam flow rate.

9. The non-transitory computer-readable storage medium in accordance with claim 8, wherein when executed by the at least one processor, the computer-executable instructions further cause the at least one processor to calculate the firing temperature bias based further on the calculated corrected steam flow rate.

10. The non-transitory computer-readable storage medium in accordance with claim 7, wherein when executed by the at least one processor, the computer-executable instructions further cause the at least one processor to operate the fuel delivery system to channel fuel into the gas turbine engine at the second fuel flow rate such that the firing temperature bias reduces a firing temperature of the gas turbine engine from a first temperature at the first power output to a second temperature at the second power output.

11. The non-transitory computer-readable storage medium in accordance with claim 7, wherein when executed by the at least one processor, the computer-executable instructions further cause the at least one processor to operate the fuel delivery system to channel fuel into the gas turbine engine at the first fuel flow rate to prevent exceeding a predetermined firing temperature limit when the gas turbine engine is operating at the first power output.

12. The non-transitory computer-readable storage medium in accordance with claim 7, wherein when executed by the at least one processor, the computer-executable instructions further cause the at least one processor to operate the steam injection system to inject steam into the gas turbine engine at the first steam flow rate based on a total mass flow rate of air through the gas turbine engine.

13. The non-transitory computer-readable storage medium in accordance with claim 7, wherein when executed by the at least one processor, the computer-executable instructions further cause the at least one processor to simultaneously increase a gas turbine engine power output while decreasing a gas turbine engine firing temperature.

14. A control system for augmenting power output by a gas turbine engine, said control system comprising:

a plurality of sensors configured to measure various gas turbine engine operating parameters;

a controller in communication with said plurality of sensors, said controller comprising a memory storage device and a processor in communication with said memory storage device, said processor configured to:

receive the measured gas turbine engine operating parameters from the plurality of sensors;

operate a fuel delivery system to channel fuel into the gas turbine engine at a first fuel flow rate corresponding to a predetermined firing temperature limit to generate a first power output, wherein firing temperature is a temperature of combustion gases located at an inlet to a turbine of the gas turbine engine;

receive a first steam flow rate;

operate a steam injection system to inject steam into the gas turbine engine at the first steam flow rate;

calculate a firing temperature bias based on the first steam flow rate and at least one of the measured gas turbine operating parameters;

calculate a suppressed firing temperature limit based on the predetermined firing temperature limit and the firing temperature bias; and operate the fuel delivery system to channel fuel into the gas turbine engine at a second fuel flow rate corresponding to the suppressed firing temperature limit to generate a second power output greater than the first power output.

15. The control system in accordance with claim 14, wherein the processor is further configured to calculate a corrected steam flow rate based on the first steam flow rate and at least one of the measured gas turbine operating parameters.

16. The control system in accordance with claim 15, wherein the plurality of sensors includes a temperature sensor configured to measure a temperature of air at a compressor inlet, wherein the corrected steam flow rate is based on the measured compressor inlet air temperature and the first steam flow rate.

17. The control system in accordance with claim 15, wherein the processor is further configured to calculate the firing temperature bias based on the calculated corrected steam flow rate.

18. The control system in accordance with claim 14, wherein the plurality of sensors includes a mass flow sensor configured to measure a mass flow rate of air within the gas turbine engine, wherein the first steam flow rate is based on the measured mass flow rate.

19. The control system in accordance with claim 14, wherein the processor is further configured to operate the fuel delivery system to channel fuel into the gas turbine engine at the second fuel flow rate such that a first firing temperature of the gas turbine engine at the first power output is reduced to a second firing temperature at the second power output.

20. The control system in accordance with claim 14, wherein the processor is further configured to operate the fuel delivery system to channel fuel into the gas turbine engine at the first fuel flow rate to prevent exceeding a predetermined firing temperature limit when the gas turbine engine is operating at the first power output.

* * * * *